United States Patent
Tamari et al.

(10) Patent No.: US 10,193,976 B2
(45) Date of Patent: Jan. 29, 2019

(54) METHOD AND SYSTEM FOR RECONSTRUCTING A SLOT TABLE FOR NFS BASED DISTRIBUTED FILE SYSTEMS

(71) Applicant: Dell Products L.P., Round Rock, TX (US)

(72) Inventors: Shaul Tamari, Arlington, MA (US); Dina Fine, Herzlia (IL)

(73) Assignee: Dell Products L.P., Round Rock, TX (US)

( * ) Notice: Subject to any disclaimer, the term of this patent is extended or adjusted under 35 U.S.C. 154(b) by 303 days.

(21) Appl. No.: 15/133,413

(22) Filed: Apr. 20, 2016

(65) Prior Publication Data

US 2017/0310750 A1    Oct. 26, 2017

(51) Int. Cl.
| | |
|---|---|
| *G06F 15/16* | (2006.01) |
| *H04L 29/08* | (2006.01) |
| *G06F 11/20* | (2006.01) |

(52) U.S. Cl.
CPC ...... *H04L 67/1097* (2013.01); *G06F 11/2033* (2013.01); *H04L 67/1014* (2013.01); *H04L 67/1034* (2013.01); *G06F 2201/80* (2013.01); *G06F 2201/805* (2013.01)

(58) Field of Classification Search
CPC ............ H04L 67/1097; H04L 67/1014; H04L 67/1034; G06F 11/2033; G06F 2201/80; G06F 2201/805
See application file for complete search history.

(56) References Cited

U.S. PATENT DOCUMENTS

| | | | |
|---|---|---|---|
| 9,100,330 B1* | 8/2015 | Noveck | H04L 47/283 |
| 2004/0081079 A1* | 4/2004 | Forest | H03M 13/43 370/216 |
| 2008/0126630 A1* | 5/2008 | Farkas | G06F 1/26 710/69 |
| 2012/0011176 A1* | 1/2012 | Aizman | G06F 17/30203 707/822 |
| 2014/0379722 A1* | 12/2014 | Mysur | G06F 3/067 707/740 |
| 2015/0201016 A1* | 7/2015 | Golander | H04L 67/1097 709/212 |
| 2016/0019206 A1* | 1/2016 | Mysur | G06Q 10/06 707/825 |

* cited by examiner

*Primary Examiner* — Moustafa M Meky
*Assistant Examiner* — Andrea L Hurst
(74) *Attorney, Agent, or Firm* — Pearl Cohen Zedek Latzer Baratz LLP

(57) ABSTRACT

A method and a system for reconstructing a slot table for Network File System (NFS) based distributed file systems are provided herein. The method includes: receiving a retried request from a client at a node of the distributed file system; in a case that the retried request is of a re-enter idempotent type, processing the request again; in a case that the retried request is file state related, checking in already opened file handles if they are open with exactly same properties already exist for the particular client, and if found, returning the file handle information to the client as if it was just opened by it; and in a case that the retried request is of a non-idempotent type attempting to perform the operation again, wherein if the source file does not exist, checking the existence of the expected outcome, and replying with a success.

15 Claims, 3 Drawing Sheets

METHOD AND SYSTEM FOR RECONSTRUCTING A SLOT TABLE FOR NFS BASED DISTRIBUTED FILE SYSTEMS

FIELD OF THE INVENTION

The present invention relates generally to the field of storage, and more particularly to distributed shared files systems.

BACKGROUND OF THE INVENTION

FIG. 1 is a block diagram illustrating non-limiting exemplary architecture of a distributed file system 100 implementing a Network Attached Storage (NAS) in accordance with the prior art. Distributed file server 120 may include a plurality of nodes (aka controllers) 130-1 to 130-x connected to a bus 180 operating in Internet Small Computer Systems Interface (iSCSI), a fiber channel (FC) or the like.

Bus 180 connects distributed file server 120 to a plurality of block storage devices 190 possibly configured as a part of a Storage Area Network (SAN) device aligned, for example, in a Redundant Array of Independent Disks (RAID) configuration.

Each of nodes 130-1 to 130-x may include a central processing unit (CPU) 160-1 to 160-x respectively, and memory units 150-1 to 150-x respectively, on which several processes are being executed. Nodes 130-1 to 130-x may communicate with a plurality of clients over network protocols such as Network File System (NFS).

Some of the processes running over nodes 130-1 to 130-x may include file system daemons (FSDs) 170-1 to 170-x. Each of nodes 130-1 to 130-x may include one or more FSDs which serve as containers for services and effectively control files in distributed file server 120.

Files in distributed file server 120 are distributed across FSDs 170-1 to 170-x and across nodes 130-1 to 130-x. Distributed file server 120 may also include Network File System (NFS) servers 140-1 to 140-x in at least one of nodes 130-1 to 130-x, wherein each of NFS servers 140-1 to 140-x may receive a request 112 from clients such as client 110.

Generally, NFS protocol such as running on distributed file server 120 strives to provide the same POSIX file-access semantics as locally-mounted POSIX file systems do. One difference is the handling of temporary failures. When client 110 removes a file and the reply for the successful remove fails to arrive to the client due to network issues or a failure of distributed file server 120 (just before the reply was sent). In such a case, client 110 may retry the operation, but the second try may report a file-not-found error which might trigger a client application failure. Similar issues can occur with other stateful operations (e.g., OPEN, LOCK).

Network File System (NFS) Version 4 Minor Version 1 Protocol—NFSv4.1 Request for Comments (RFC) 5661 tries to remedy the duplicate-request issue of stateful requests and introduces the slot table mechanism such as slot tables 175-1 to 175-x which are duplicate-reply-cache array (with a pre-negotiated size). Each client is associated with a server-side slot-table object stored on respective slot tables 175-1 to 175-x, and every client request such as 112 is associated a slot in the slot table. Once processing of a request 112 is complete, the reply is cached in its associated slot of slot tables 175-1 to 175-x. When any NFS server 140-1 sees a request 112, it first checks for a match in the slot table 175-1. In a case that NFS server 140-1 finds a ready reply, it may immediately send it back to client 110. The RFC 5661 defines that, if the server can't find a client related slot entry, the operation should fail.

However, RFC 5661 slot table doesn't solve distributed multi-nodes clusters failover scenarios. An exemplary scenario in distributed file server 120 is where the client 110 is connected to controller 130-1, streaming a video file. If controller 130-1 fails for some reason, the client may be redirected to another controller such as controller 130-2. Client 110 may try to proceed the flow from the same point it was disturbed by 130-1 failure. But 130-2 doesn't have client 110 slot table entry. The operation could fail according to RFC 5661, and client 110 may need to close all open files and to restart the session.

SUMMARY OF THE INVENTION

Some embodiments of the present invention provide a method for enabling a seamless failover between distributed system controllers. In a seamless failover, the client may proceed from the exact same point it stopped on failed controller. This may enable, in a non-limiting example, a client to watch video stream, be reconnected to another node and only notice a little freeze during the failover.

Some embodiments of the present invention implement seamless failover mechanism on a distributed, highly available and high performance file server without undermining correctness, performance and cost issues.

Some embodiments of the present invention provide a method of reconstructing a slot table for Network File System (NFS) based distributed file systems. The method may include: receiving a retried request from a client at a node of the distributed file system; determining an expected size of sessions slot table by inspecting a COMPOUND message's SEQUENCE operation 'highest_slotid' field at said client request; in a case that the retried request is of a re-enter idempotent type, processing the request again; in a case that the retried request is file state related, checking in already opened file handles if they are open with exactly same properties already exist for the particular client, and if found, returning the file handle information to the client as if it was just opened by it; and in a case that the retried request is of a non-idempotent type attempting to perform the operation again, wherein if the source file does not exist, checking the existence of the expected outcome, and replying with a success.

According to some embodiments of the present invention, the distributed file systems are compliant with NFSv4.1 protocol.

According to some embodiments of the present invention, the re-enter idempotent type client request may include at least one of: LOOKUP and GETATTR operations.

According to some embodiments of the present invention, the file state related client request may include at least one of: OPEN and LOCK operations.

According to some embodiments of the present invention, the retried request of a non-idempotent type may include at least one of: RENAME and REMOVE operations.

According to some embodiments of the present invention, the checking of the existence of the expected outcome may include checking an existence of a target renamed file.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
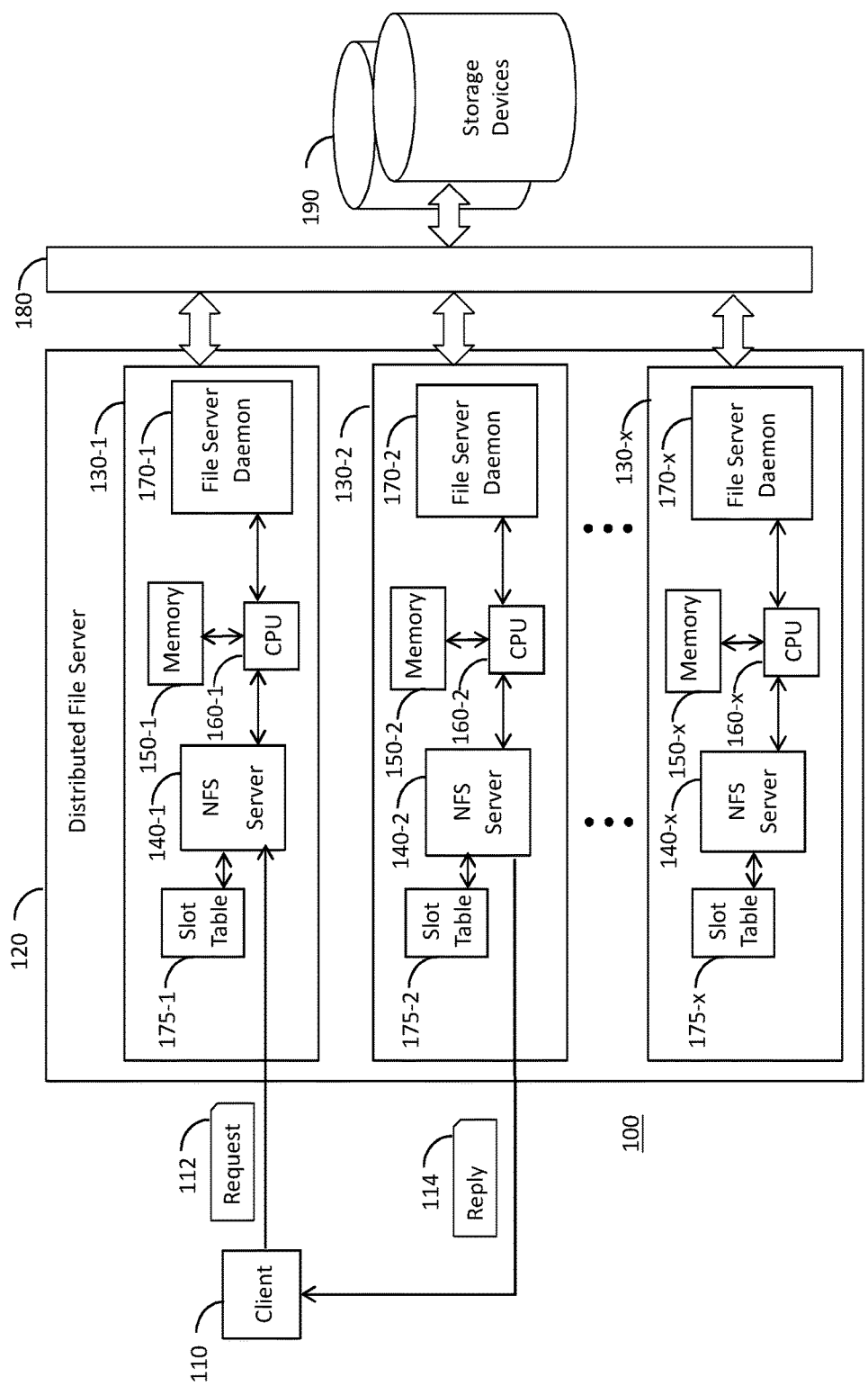
FIG. 1 is a block diagram illustrating non-limiting exemplary architecture of a file system in accordance with some embodiments of the prior art.

It may be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention may be described. For purposes of explanation, specific configurations and details are set forth in order to provide a thorough understanding of the present invention. However, it may also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 2:
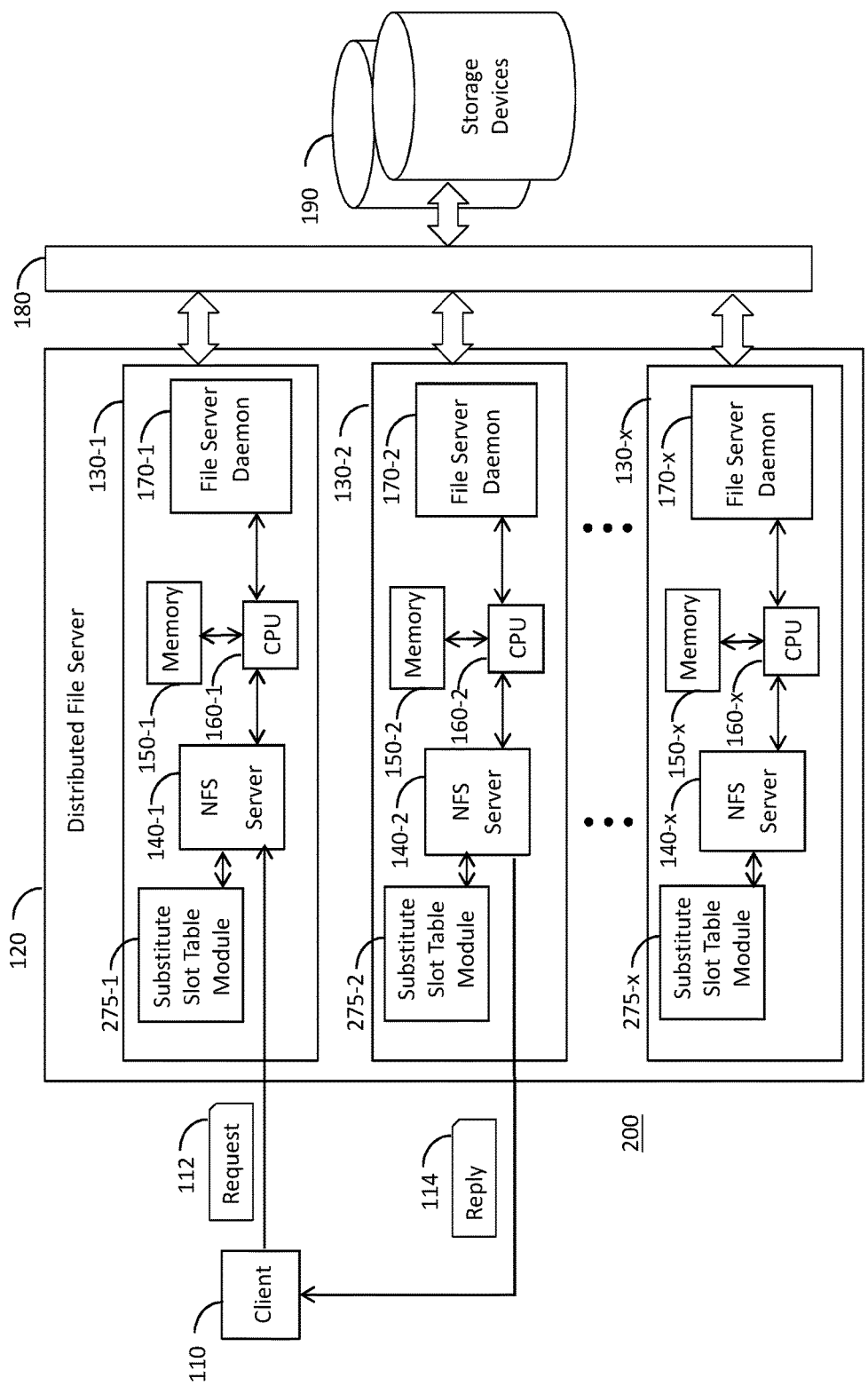
FIG. 2 is a block diagram illustrating non-limiting exemplary architecture of a file system in accordance with some embodiments of the present invention.

FIG. 2 is a block diagram illustrating non-limiting exemplary architecture of a file system in accordance with some embodiments of the present invention. System 200 has all components of aforementioned distributed file system 100, except that every controller has an additional process called a substitute slot table module 275 running on it. Some embodiments of the present invention suggest to imitate the functionality of a slot table by reconstructing a slot table entry existence for a client which has been moved between controllers. In consequence, the file system may not fail the client requests in case of an experienced failover, but instead the server may attempt, using a substitute slot table module to re-create the reply. This emulating or faking of a slot table functionally is carried out by a substitute slot table module 275 which is a process running on each of controllers 131.

In accordance with some embodiments of the present invention, once controller 130-1 fails, a retried request is directed to controller 131-2. Substitute slot table module 275-2 on controller 131-2 is configured to learn the expected size of sessions slot table from the client request by inspecting a COMPOUND message's SEQUENCE operation 'highest_slotid' field.

Then, if the retried request is of a re-enter idempotent type (such as LOOKUP or GETATTR)—the request may be processed again. In a case that the retried request is file state related (e.g., OPEN, LOCK), then substitute slot table module 275-2 check in already opened file handles if the open with exactly same properties already exist for the particular client. If found, substitute slot table module 275-2 may instruct NFS server 140-2 to return the file handle information to the client as it was just opened by him.

In a case that a retried request is of a non-idempotent type (e.g. RENAME, REMOVE), the operation may be attempted again. If the source file doesn't exist (since was already renamed or removed), we check the existence of the expected outcome (like the existence of a target renamed file), and we take a chance and reply with a success.

Figure 3:
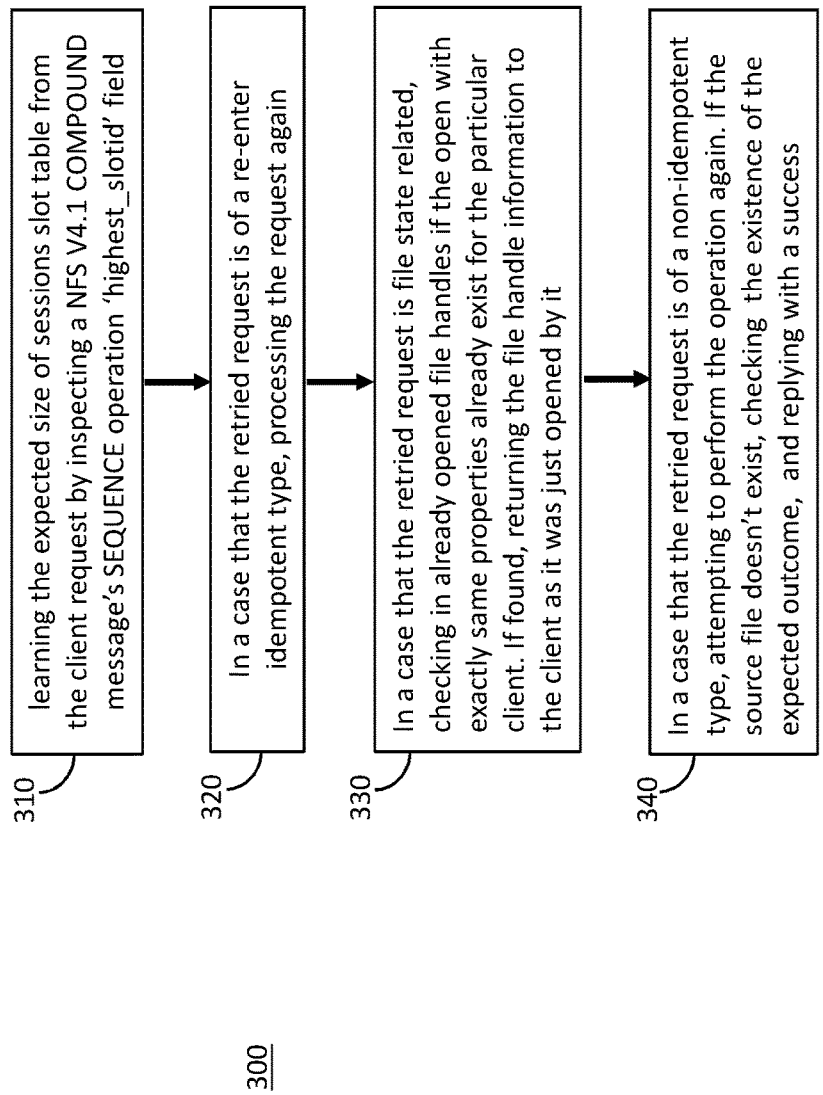
FIG. 3 is a high level flowchart illustrating non-limiting exemplary method in accordance with some embodiments of the present invention.

FIG. 3 is a high level flowchart illustrating non-limiting exemplary method in accordance with some embodiments of the present invention. Method 300 may include: learning the expected size of sessions slot table from the client request by inspecting a COMPOUND message's SEQUENCE operation 'highest_slotid' field 310; In a case that the retried request is of a re-enter idempotent type (such as LOOKUP or GETATTR), we process the request again 320. In a case that the retried request is file state related (e.g. OPEN, LOCK), checking in already opened file handles if the open with exactly same properties already exist for the particular client. If found, returning the file handle information to the client as it was just opened by it 330 (each OPEN request has unique ID so it is possible to verify that it is actual same OPEN request); and in a case that the retried request is of a non-idempotent type (e.g. RENAME, REMOVE), attempting to perform the operation again. If the source file doesn't exist (since was already renamed or removed), checking the existence of the expected outcome (like the existence of a target renamed file), and replying with a success (assuming it is indeed correct) with the correct answer 340.

Some embodiments of the present invention are particularly advantageous for DELETE and RENAME requests which are problematic use cases in case a failover has occurred immediately after accomplishing the request but without being able to convey the reply to the client.

Advantageously, some embodiments of the present invention provide a seamless failover for NFS clients between different nodes, and high performance processing for NFS requests, by keeping the slot table in controller local memory only.

In order to implement the method according to some embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer may also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As may be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects of the present invention are described above with reference to flowchart illustrations and/or portion diagrams of methods, apparatus (systems) and computer program products according to some embodiments of the invention. It may be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It may also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for enabling a seamless failover between distributed system controllers in a Network File System (NFS) based distributed file systems, the method comprising:
   receiving a retried request from a client at a controller of the distributed file system, wherein the distributed file systems are compliant with NFSv4.1 protocol;
   determining an expected size of sessions slot table by inspecting a COMPOUND message's SEQUENCE operation 'highest_slotid' field at said client request;
   in a case that the retried request is of a re-enter idempotent type, processing the request again;
   in a case that the retried request is file state related, checking in already opened file handles if the already opened file handles are open with exactly same properties already exist for the particular client, and if found, returning the file handle information to the client as if it was just opened by it; and
   in a case that the retried request is of a non-idempotent type attempting to perform the operation again, wherein if the source file does not exist, checking the existence of the expected outcome, and replying with a success.

2. The method according to claim 1, wherein the re-enter idempotent type client request comprises at least one of: LOOKUP and GETATTR operations.

3. The method according to claim 1, wherein the file state related client request comprises at least one of: OPEN and LOCK operations.

4. The method according to claim 1, wherein the retried request of a non-idempotent type comprises at least one of: RENAME and REMOVE operations.

5. The method according to claim 1, wherein said checking of the existence of the expected outcome comprises checking an existence of a target renamed file.

6. A system for enabling a seamless failover between distributed system controllers in a Network File System (NFS) based distributed file systems, the system comprising:
   a distributed cluster of controllers configured to receive a retried request from a client, wherein each controller comprises substitute slot table modules being a process running on it respective controller;
   wherein each of the substitute slot table modules is configured to:
     determine an expected size of sessions slot table by inspecting a COMPOUND message's SEQUENCE operation 'highest_slotid' field at said client request;
     in a case that the retried request is of a re-enter idempotent type, process the request again;
     in a case that the retried request is file state related, check in already opened file handles if the already opened file handles are open with exactly same properties already exist for the particular client, and if found, returning the file handle information to the client as if it was just opened by it; and
     in a case that the retried request is of a non-idempotent type, attempt to perform the operation again, wherein if the source file does not exist, check the existence of the expected outcome, and reply with a success,
     wherein the distributed file systems are compliant with NFSv4.1 protocol.

7. The system according to claim 6, wherein the re-enter idempotent type client request comprises at least one of: LOOKUP and GETATTR operations.

8. The system according to claim 6, wherein the file state related client request comprises at least one of: OPEN and LOCK operations.

9. The system according to claim 6, wherein the retried request of a non-idempotent type comprises at least one of: RENAME and REMOVE operations.

10. The system according to claim 6, wherein said checking of the existence of the expected outcome comprises checking an existence of a target renamed file.

11. A non-transitory computer readable medium comprising a set of instructions that when executed cause at least one processor to:
receive a retried request from a client at a distributed file system, wherein the distributed file systems are compliant with NFSv4.1 protocol;
determine an expected size of sessions slot table by inspecting a COMPOUND message's SEQUENCE operation 'highest_slotid' field at said client request;
in a case that the retried request is of a re-enter idempotent type, process the request again;
in a case that the retried request is file state related, check in already opened file handles if they are open with exactly same properties already exist for the particular client, and if found, returning the file handle information to the client as if it was just opened by it; and
in a case that the retried request is of a non-idempotent type, attempt to perform the operation again, wherein if the source file does not exist, check the existence of the expected outcome, and reply with a success.

12. The non-transitory computer readable medium according to claim 11, wherein the re-enter idempotent type client request comprises at least one of: LOOKUP and GETATTR operations.

13. The non-transitory computer readable medium according to claim 11, wherein the file state related client request comprises at least one of: OPEN and LOCK operations.

14. The non-transitory computer readable medium according to claim 11, wherein the retried request of a non-idempotent type comprises at least one of: RENAME and REMOVE operations.

15. The non-transitory computer readable medium according to claim 11, wherein said checking of the existence of the expected outcome comprises checking an existence of a target renamed file.

* * * * *